United States Patent [19]
Miller et al.

[11] Patent Number: 5,301,045
[45] Date of Patent: Apr. 5, 1994

[54] HELICAL LIQUID CRYSTALLINE ELEMENT WHICH PRODUCES LINEAR POLARIZED LIGHT

[75] Inventors: Alfred Miller, Planegg; Franz-Heinrich Kreuzer, Martinsried; Horst Leigeber, Oberhaching; Christoph Bräuchle; Andreas Petri, both of München, all of Fed. Rep. of Germany

[73] Assignee: Consortium für elektrochemische Industrie GmbH, Munich, Fed. Rep. of Germany

[21] Appl. No.: 961,299

[22] Filed: Oct. 15, 1992

[30] Foreign Application Priority Data

Nov. 18, 1991 [DE] Fed. Rep. of Germany ....... 4137943

[51] Int. Cl.$^5$ .................... G02F 1/13; G02F 1/1335
[52] U.S. Cl. ........................ 359/37; 359/63; 359/101
[58] Field of Search .................... 359/37, 63, 101

[56] References Cited

U.S. PATENT DOCUMENTS

| | | | |
|---|---|---|---|
| 3,711,181 | 1/1973 | Adams, Jr. et al. | 359/37 |
| 4,388,453 | 6/1983 | Finkelmann et al. | 528/15 |
| 5,054,888 | 10/1991 | Jacobs et al. | 359/76 |
| 5,193,015 | 3/1993 | Shanks | 359/101 |

FOREIGN PATENT DOCUMENTS

| | | |
|---|---|---|
| 0066137 | 7/1985 | |
| 0397263 | 11/1990 | |
| 0407830 | 1/1991 | |
| 3808430 | 9/1989 | Fed. Rep. of Germany |
| 3920420 | 1/1991 | Fed. Rep. of Germany |

OTHER PUBLICATIONS

Chiellini et al., "Polymers with Main-chain Mesogenic Units", Comprehensive Polymer Science, vol. 5, Pergamon Press 1989; pp. 701-723.
de Vries, "Rotary Power and other optical properties of certain liquid crystals", Acta crystallogr., No. 4, 1951, pp. 219-226.
G. Meier et al., Applications of Liquid Crystals, spring verlag, 1975, pp. 9-11.
Jacobs, "Liquid Crystal Devices for Laser Systems", Journal of Fusion Energy, vol. 5, No. 1, 1986, pp. 65-75.
Eberle et al. "Inverse angle dependence of the reflection colours of cholesteric polymeric liquid crystals mixed with pigments", Liquid crystals, vol. 5., No. 3, 1989, pp. 907-916.
Goodby et al., "A new molecular ordering in helical liquid crystals", J. Am. Chem. Soc. (1989) 111, pp. 8119-8125.
Bunning et al., "Bilayer structures in cholesteric cyclic siloxane liquid crystals", Liquid Crystals, vol. 10, No. 4, 1991, pp. 445-456.
Zentel, "Polymeus with Side-Chain Mesogenic Units", Comprehensive Polymer Science, vol. 5, Pergamon Press 1989, pp. 724-732.
Eichler et al., Bergmann-Schaefer Lehrbuch der Experimentalphysik Band III Optic, 1987, p. 560-567.

*Primary Examiner*—William L. Sikes
*Assistant Examiner*—Ron Trice

[57] ABSTRACT

The invention relates to optical elements based on helical liquid-crystalline substances, having reflection bands of linear-polarized light, and to a process for preparing the same. The optical elements of this invention contain only one optically effective component based on helical liquid-crystalline substances. They reflect light incident perpendicular to the surface in a linear-polarized manner parallel to the direction of incidence of the incident light. The process for preparing the optical elements comprises illuminating a helical liquid-crystalline substance which contains at least one photoisomerizable substance with linear-polarized light in such a manner that this substance is subsequently aligned so that it exhibits at least one reflection band of linear-polarized light on illumination. Suitable helical liquid-crystalline substances are in particular organopolysiloxanes. The optical elements are suitable, for example, for data storage.

10 Claims, 7 Drawing Sheets

HELICAL LIQUID CRYSTALLINE ELEMENT WHICH PRODUCES LINEAR POLARIZED LIGHT

The invention relates to optical elements based on helical liquid-crystalline substances, having reflection bands of linear-polarized light, and to a process for preparing the same.

BACKGROUND OF THE INVENTION

Between the solid crystalline phase and the fluid melt, intermediate phases occur in certain substances which combine structural and dynamic properties of both the ordered crystalline state and of the unordered melt state. Although these phases are fluid, they have, for example, optical properties which are characteristic of the majority of crystalline, but also partially crystalline substances such as, for example, birefringent. These are referred to as intermediate phases (mesophases) or alternatively liquid-crystalline phases. These phases can be obtained by varying the temperature, in this case one refers to thermotropic liquid crystals, or in solution by varying the concentrations. Hereinafter, we are only concerned with thermotropic liquid crystals.

The existence ranges of these intermediate phases are generally characterized by, for example, transition temperatures, determined calorimetrically or by means of a polarizing microscope, from the crystalline state to the liquid-crystalline state (glass transition temperature) and from the liquid-crystalline state to the liquid melt (clearing point) (cf. G. Allen & J.C. Bevington, Eds., *Comprehensive Polymer Science*, Vol. 5, pp. 701-732, Pergamon Press, 1989). If different liquid-crystalline states are present, the set of corresponding transition temperatures is indicated.

The structure of the liquid-crystalline phases is characterized by a different long-range and short-range degree of ordering of the molecules. A distinction is made between nematic phases, smectic phases and cholesteric phases. Cholesteric phases are also known as chiral nematic phases or twisted nematic phases.

In the nematic phase, the molecular centers are distributed without order, while the long axes of the molecules are aligned parallel to one another. This is different to the state in the fluid melt, where the molecule long axes are arranged randomly.

In the smectic phases, a regular arrangement of the molecular centers in space occurs in addition to the alignment order of the nematic phase described above. This regular arrangement can be present along one, but also along two or even three, independent spatial axes. These phases are nevertheless fluid.

In the cholesteric phase, layers of nematically arranged molecules are arranged one on top of the other so that a continuous helical variation of the alignment direction of the molecule long axes is produced. The molecules thus form a helical structure with the period p. The cholesteric phase thus has a helical structure. Of the liquid-crystalline phases, it has particular properties (cf., for example. Bergmann-Schaefer, *Experimentalphysik*, Volume III: *Optik*, 7th Edition (1987), pp. 560-567, or de Vries, Acta crystallogr., (1951), 4, 219-226).

Thus, it is known that the cholesteric phase of liquid-crystalline substances in a macroscopic alignment in which the helical axes are arranged parallel to one another and perpendicular to the surface reflects light incident parallel to the helical axis (angle of incidence 0°) in a wavelength range $\lambda_{ref}$, which is determined by the period p, also known as the pitch, the refractive indices and the birefringence of the helical material (de Vries, H.I., (1951), Acta crystallogr., 4, 219; Meier, G. in: *Physical Properties of Liquid Crystals*, ed.: Meier, Sackmann, Grabmeier, Springer-Verlag, (1975), 9-11).

The reflected light is circular-polarized, the direction of rotation of the reflected light corresponding to the direction of rotation of the helical structure of the cholesteric phase (Jacobs, S.D., J. *Fusion Energy*, (186), 5(1), 65). However, no reflections occur at $\lambda_{ref}/2$, $\lambda_{ref}/3$, etc, as in other systems which have a periodic structure (for example X-ray diffraction at crystals or vapor-deposited coatings for optics) known as Bragg reflections. If the helix axis is tilted by the angle $\alpha$, the reflection wavelength shifts in accordance with the Bragg law to $\lambda_{ref} \times \cos(\alpha)$ (Eberle, H.J., Miller, A., Kreuzer, F.-H., *Liquid Crystals*, (1989), 5(3), 907).

Other known liquid-crystalline phases having a helical structure are, for example, the $S_A^*$ and $S_c^*$ phases. In the $S_A^*$ phase, the molecules within the layers are in an arrangement which is analogous to the $S_A$ phase. From layer to layer, however, the molecules are twisted with respect to one another. A twisting of the smectic layers is thus obtained (J.W. Goodby et al., *A New Molecular Ordering in Helical Liquid Crystals*, J. Am. Chem. Soc. (1989) 111, 8119-8125; T.J. Bunning et al., *Bilayer structures in cholesteric, cyclic-siloxane liquid crystals*, LIQUID CRYSTALS (1991), 10(4), 445-456). In the $S_c^*$ phase, which is used, for example, in ferroelectric liquid-crystalline displays, the tilt angle of the molecules forms a helical structure. For a suitable periodicity of the helix, selective reflection of light also occurs in this phase. These phases have the same optical properties as the cholesteric phase, which was described above.

German Offenlegungsschrift DE 3 920 420 describes a process for the production of optical components on the basis of polymeric supports containing at least one dye, using linear-polarized light. In the process described therein, a system S, comprising the polymeric organic support T and at least one photoisomerizable dye F, is varied in a specific manner by a macroscopic, light-induced structuring by incidence of linear-polarized light, depending on the polarization direction and the morphology of the organic support.

Polymeric organic supports T which are suitable for the above process are non-helical and non-twisted nematic polymers. These are irradiated with linear-polarized light, and the effects are detected in transmission.

Optical elements which reflect linear-polarized light at an angle not equal to 0° to the direction of the incident light (dielectric layers) are known.

It is likewise known that the combination of a layer of a cholesteric liquid crystal and a quarter-wave plate acts as a reflector for linear-polarized light.

Therefore, it is an object of the present invention to provide optical elements which reflect light incident perpendicular to the surface in a linear-polarized manner parallel to the direction of incidence of the incident light. Another object of the present invention is to provide optical elements containing only one optically effective component based on liquid-crystalline substances. Still another object of the present invention is to provide an optical element which by illuminating a helical liquid-crystalline substance with linear-polarized light in such a manner that the substance is subsequently aligned so that it exhibits at least one reflection band of linear-polarized light on illumination. A further object of the present invention is to provide a process for preparing the optical elements which reflects light incident perpendicular to the surface in a linear-polarized manner parallel to the direction of incidence of the incident light.

SUMMARY OF THE INVENTION

The foregoing objects and others which will become apparent from the following description are accomplished in accordance with this invention, generally speaking by providing optical elements containing only one optically effective component based on helical liquid-crystalline substances, which elements reflect light incident perpendicular to the surface in a linear-polarized manner parallel to the direction of incidence of the incident light.

DESCRIPTION OF THE INVENTION

The optical elements containing only one optically effective component based on helical liquid-crystalline substances are obtainable by illuminating a helical liquid-crystalline substance with linear-polarized light in such a manner that this substance is subsequently aligned so that it exhibits at least one reflection band of linear-polarized light on illumination.

For the purposes of this invention, helical substances are taken to mean substances which have a helical phase whose optical properties correspond to those of a cholesteric phase.

All helical liquid-crystalline substances which contain at least one photoisomerizable compound are suitable for use in the process of this invention.

Both low-molecular-weight liquid crystals and helical liquid-crystalline oligomers or polymers are suitable. The mesogenic radicals may be present both in the main chain and in the side chain. Helical liquid-crystalline organopolysiloxanes are particularly suitable. Linear, cyclic or branched organopolysiloxanes are equally suitable. Organopolysiloxanes containing the mesogenic radicals in the side chain are particularly preferred. These substances can be prepared, for example, as described in German Offenlegungsschrift DE 3 808 430 or in U.S. Pat. No. 4,410,570. Helical liquid-crystalline substances which have a glass transition temperature higher than the operating temperature of the optical components of this invention are preferably selected.

The helical liquid-crystalline substances must be employed in the optical elements in a layer thickness of at least two pitch lengths, preferably from 4 to 200 pitch lengths.

Examples of suitable photoisomerizable compounds are all the photoisomerizable dyes disclosed in DE 3 920 420 and DE 3 808 430. The criteria given in DE 3 920 420 for the choice of the dye F apply to the choice of suitable photoisomerizable dyes. Thus, the suitable dyes preferably experience a change in molecular geometry on exposure to light, preferably having a wavelength in the range of their absorption band. The suitable dyes preferably absorb in the range of from 250 to 2000 nm. They expediently contain at least one structural element which changes its geometry on illumination. Such structural elements may contain, for example, multiple bonds, and in particular have the possibility for cistrans isomerism. Examples which may be mentioned of structural elements A which enable isomerism are:

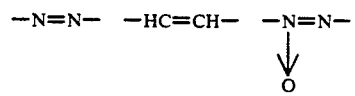

In particular, the dyes contain groups in which two aromatic rings or ring systems are connected by the structural elements A, such as, for example,

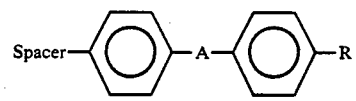

where R may be, for example, one of the following groups:

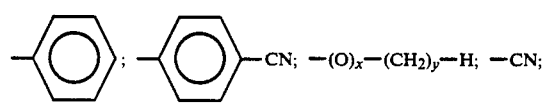

where x=0 or 1, preferably 1, and y=0 to 10, preferably 1 to 5.

The spacer provides connection to the polymer and may be, for example, one of the following groups:

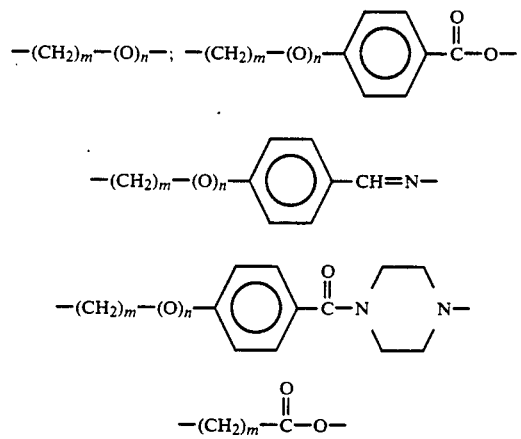

where m=0 to 10, preferably 3 to 6, and n=0 or 1.

The dyes are admixed with the helical liquid crystals in an amount of between 1 and 50% by weight, preferably between 5 and 40% by weight, based on the weight of the finished substance.

If desired, the dyes are covalentlybonded to the helical liquid crystals in an amount of between 1 and 70% by weight, preferably between 5 and 50% by weight. This can be carried out, for example, by the process described in DE-A-38 08 430 or DE-A-39 20 420. The covalent bonding is necessary, for example, if the dye is immiscible with the helical liquid crystals.

Helical liquid-crystalline substances which are suitable in this way are aligned by known processes. They can be aligned, for example, by mechanical treatment, such as by shearing or on knife application, by surface effects, or by electrical or magentic fields.

The helical liquid-crystalline substances aligned in this way are illuminated with linear-polarized light whose direction of incidence forms an angle with the helical axis of the helical liquid-crystalline substance of between 0° and 30°, preferably between 0° and 10°.

Linear-polarized light having a wavelength in the range in which the absorption of the photoisomerizable dye of the helical liquid-crystalline substance lies is preferably suitable. Particular preference is given to a wavelength in the range of the absorption band of the photoisomerizable compound of the helical liquid-crystalline substance. The light used may be monochromatic or polychromatic, coherent or incoherent.

The illumination should be carried out at an exposure energy per unit area of from 0.5 J/cm$^2$ to 200 J/cm$^2$, preferably from 1 to 80 J/cm$^2$. The illumination should not be carried out at a greater exposure energy per unit area since otherwise all bands disappear and the sample is converted into a quasi-nematic structure.

Surprisingly, it has been found that helical liquid-crystalline substances illuminated in this way have advantageous properties. On illumination with light, the substances according to the invention surprisingly have, in addition to the known reflection band, at least one additional reflection band. Usually 2, 3 or more further reflection bands occur. The additional reflection bands which occur in addition to the original reflection band at the reflection wavelength of the helical liquid-crystalline substance have a wavelength of about $\frac{1}{2}$, $\frac{1}{3}$, $\frac{1}{4}$, etc. of the reflection wavelength of the helical substance. The light reflected in these new reflection bands is surprisingly linear-polarized. It is also entirely surprising that the light reflected in the original reflection band for circular-polarized light is linear-polarized after the illumination according to the invention. It is furthermore entirely surprising that, on illumination perpendicular to the surface of the optical components according to the invention, the light reflected parallel to the direction of incidence is linear-polarized. The transmitted light is likewise linear-polarized.

It has been found that, for each helical liquid-crystalline substance, a fixed angle $\beta$ exists between the polarization direction of the illumination light for the production of the components and the polarization direction of the light reflected by the components according to the invention. The fixed angle $\beta$ is different for different helical substances and also for different preparations of a substance. However, $\beta$ is constant for a single preparation of a substance. Thus, a desired polarization direction of the reflection bands can easily be produced. To this end, the angle $\beta$, which is constant for the preparation, is first determined by a test exposure of defined polarization direction and measurement of the polarization direction of the reflection bands at the desired wavelength. Using this angle $\beta$, the illumination light polarization direction which is necessary for a certain desired polarization direction of the reflected light can then be determined. By illuminating a helical liquid-crystalline substance with linear-polarized light of a polarization direction determined in this way, an optical component having the polarization direction of the reflection bands which is desired in each case can thus be produced.

The polarization direction of the reflection bands can also be controlled, for example, in an analogous manner to that described above through the choice of the liquid-crystalline material used in each case.

The color of the reflection bands can also be controlled through an appropriate choice of the liquid-crystalline material used in each case.

In a preferred embodiment of the process according to the invention, the helical liquid-crystalline substance is applied to a support substrate. The support substrate is generally planar. The helix axis of the helical liquid-crystalline substance is preferably perpendicular to the surface of the support substrate. Examples of suitable support substrates are paper, plastic, glass, quartz and metal. The helical liquid-crystalline substance applied to the support substrate can be covered by a further substrate. The further substrate must be transparent to the illumination light and to the light reflected according to the invention.

In a further embodiment, it is possible to use unsupported films of a helical liquid-crystalline substance in the process of this invention.

The optical elements according to the invention can also be produced by other processes, such as, for example, by application of electrical or magnetic fields.

The alignment of the elements according to the invention is reversible. It can be eliminated, for example, by warming the sample to above the glass transition temperature of the helical liquid-crystalline substance employed. To this end, the sample should preferably be warmed to a temperature which is more than 5K above the corresponding glass transition temperature.

An application of the optical elements according to the invention is their use as linear-polarized reflectors or as polarizers.

Furthermore, line filters can be produced by a combination of optical elements according to the invention with polarization directions selected to be suitable to one another. To this end, two optical elements according to the invention are placed one on the other in such a way that the light transmitted by the first element is reflected by the second element.

A further significant application of the elements according to the invention is their use for data storage. By exposure, for example by means of the process of this invention, data can be stored, for example, at the exposed points. The data can be recovered, for example, from their reflection. These data may be, for example, pixels for digital storage, images or characters.

Figure 1:
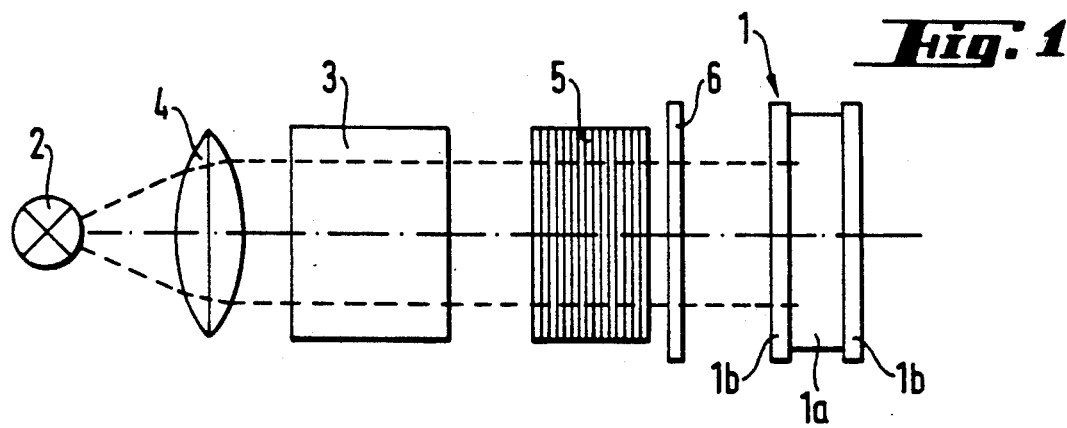
FIG. 1 shows a diagrammatic experimental set-up for carrying out the process of this invention as described in the examples.

For technical reasons associated with the measurements, the absorption of the samples instead of the reflection or transmission of the samples was determined in the polarization-dependent measurements in the examples. Since the samples of this invention do not absorb within the reflection bands, this absorption is an apparent absorption indicated by the instrument used instead of the transmission actually measured.

EXAMPLES

The following substances were synthesized by the procedure of DE 3808430 for use in the process of this invention:

Substance I:

About 0.07 ml of a 1% by weight solution of dicyclopenta-dienylplatinum dichloride in dichloromethane, the solution having been prepared by processes known from the literature, such as, for example, J. Chatt, L.M. Vallarino, L.M. Venanzi, J. Chem. Soc. (London) (1957) 2496-505 and H.C. Clark, L.E. Manzer, J. Organometal. Chem. 59 (1973) 411-28, was added to a solution containing 2.0 g of 4'-phenylphenyl 4-(propen-2-oxy)-benzoate, 3.33 g of dihydrocholesteryl 4-(propen-2-oxy)benzoate, 0.86 g of 4-(4-propen-2-oxy)-4'-ethoxyazobenzene and 0.91 g of tetramethylcyclotetrasiloxane in 18 ml of dry toluene, and the resultant mixture was refluxed for 4 hours. In order to remove fine platinum-containing precipitates, the mixture was filtered through a column 5 cm in length filled with silica gel or Tonsil. The solvent was subsequently removed by distillation under reduced pressure (26 mbar), and the residue was reprecipitated 2-3 times from tetrahydrofuran using ethanol and dried at 100° C. under reduced pressure (26 mbar). About 3.0 g of a product having a glass transition temperature of 54° C. and a helical phase up to the clearing point of 193° C were obtained. The product has a reflection maximum at 1080 nm in the aligned state.

Substance II:

About 0.06 ml of a 1% by weight solution of dicyclopenta-dienylplatinum dichloride in dichloromethane was added to a solution containing 2.0 g of 4'-phenylphenyl 4-(propen-2-oxy)benzoate, 2.0 g of dihydrocholesteryl 4-(propen-2-oxy)benzoate, 0.69 g of 4-(4-propen-2-oxy)-4'-ethoxyazobenzene and 0.73 g of tetramethylcylotetrasiloxane in 20 ml of dry toluene, and the resultant mixture was refluxed for 4 hours. In order to remove fine platinum-containing precipitates, the mixture was filtered through a short column filled with silica gel or Tonsil. The solvent was subsequently removed by distillation under reduced pressure, and the residue was reprecipitated 2-3 times from tetrahydrofuran using ethanol and dried at 100° C. under reduced pressure. About 2.4 g of a product having a glass transition temperature of 55° C and a helical phase up to the clearing point of 195° C. were obtained. The product has a reflection maximum at 1550 nm in the aligned state.

Substance III:

About 0.15 ml of a 1% by weight solution of dicyclopenta-dienylplatinum dichloride in dichloromethane was added to a solution containing 5.50 g of 4'-phenylphenyl 4-(propen-2-oxy)benzoate, 4.19 g of dihydrocholesteryl 4-(propen-2-oxy)-benzoate, 2.94 g of 4-(4-propen-2-oxy)-4'-ethoxyazobenzene and 2.09 g of tetramethylcyclotetrasiloxane in 35 ml of dry toluene, and the resultant mixture was refluxed for 3 hours. In order to remove fine platinum-containing precipitates, the mixture was filtered through a short column filled with silica gel or Tonsil. The solvent was subsequently removed by distillation under reduced pressure, and the residue was reprecipitated 4-5 times from tetrahydrofuran using ethanol and dried at 100° C. under reduced pressure. About 5.1 g of a product having a glass transition temperature of 43° C. and a helical phase up to the clearing point of 177° C. were obtained. The product has a reflection maximum at 1750 nm in the aligned state.

Substance IV:

About 0.13 ml of a 1% by weight solution of dicyclopenta-dienylplatinum dichloride in dichloromethane was added to a solution containing 3.50 g of 4'-phenyl 4-(propen-2-oxy)-benzoate, 5.82 g of dihydrocholesteryl 4-(propen-2-oxy)benzoate, 2.57 g of 4-(4-propen-2-oxy)-4'-ethoxyazobenzene and 1.82 g of tetramethylcyclotetrasiloxane in 30 ml of dry toluene, and the resultant mixture was refluxed for 4 hours. The work-up was carried out analogously to substance I. About 10.0 g of a product having a glass transition temperature of 53° C. and a helical phase up to the clearing point of 189° C. were obtained. The product has a reflection maximum at 1310 nm in the aligned state.

Substance V:

About 0.14 ml of a 1% by weight solution of dicyclopenta-dienylplatinum dichloride in dichloromethane was added to a solution containing 2.0 g of 4'-phenylphenyl 4-(propen-2-oxy)benzoate, 3.40 g of dihydrocholesteryl 4-(propen-2-oxy)-benzoate, 1.50 g of 4-(4-propen-2-oxy)-4'-ethoxyazobenzene and 1.0 g of tetramethylcyclotetrasiloxane in 21 ml of dry toluene, and the resultant mixture was refluxed for 4 hours. In order to remove fine platinum-containing precipitates, the mixture was filtered through a short column filled with silica gel or Tonsil. The solvent was subsequently removed by distillation under reduced pressure, and the residue was reprecipitated 2–4 times from tetrahydrofuran using ethanol and dried at 100° C. under reduced pressure. About 4.2 g of a product having a glass transition temperature of 55° C. and a helical phase up to the clearing point of 199° C. were obtained. The product has a reflection maximum at 1250 nm in the aligned state.

EXAMPLE 1

Substance I (1a in FIG. 1) was aligned with the helix axis perpendicular to the substrate (glass) between two glass plates (1b in FIG. 1) coated with polyimide as alignment aid, by heating at 140° C. and applying shear forces. The alignment of the substance can be seen from the occurrence, after illumination with linear-polarized light, of the reflection band at 1080 nm which is typical of this phase (measurement curve 1 in FIG. 2). Then, as shown diagrammatically in FIG. 1, sample 1 was illuminated with linear-polarized light from a 200 W mercury high-pressure lamp 2. The heat-radiation filter used was a water cell (3) 4 cm in length. The light was focused onto the sample using a quartz condenser (4). A stack (5) of glass plates, comprising 15 glass plates each with a thickness of about 1 mm, positioned in the ray path at the Brewster angle and a foil polarizer (6) were used to polarize the light. The spectral region of the light was restricted to from 320 to 920 nm by the water bath and the optic materials used. The light had a power of 200 mW/cm² at the sample surface. The sample was illuminated for 10 minutes. The sample illuminated in this manner showed, in addition to the reflection band of the unilluminated sample at $\lambda_{ref}$=1080 nm, a band at about $\lambda_{ref}/2$ (see curve 2 in FIG. 2). At shorter wavelengths (<500 nm), the sample absorbed so much that shorter-wave bands could no longer be detected. The bands were detected by transmission or reflection measurements using a Lambda19 UV-VIS-NIR spectrophotometer (Perkin-Elmer) with reflection attachment. The reflection here is determined at an angle of 6° to the sample normal. If the sample is observed under a polarizing microscope (incident light, polarizer and analyzer parallel), the reflected light becomes visible at about $\lambda_{ref}/2$ (green light) at a defined position on rotating the exposed sample. If the sample is rotated by 90°, this reflection disappears. The reflected light must thus be linear-polarized. If the sample is illuminated further (4 hours), all the bands disappear (see curve 3 in FIG. 2); the sample is converted into a quasi-nematic structure.

EXAMPLE 2

Figure 2:
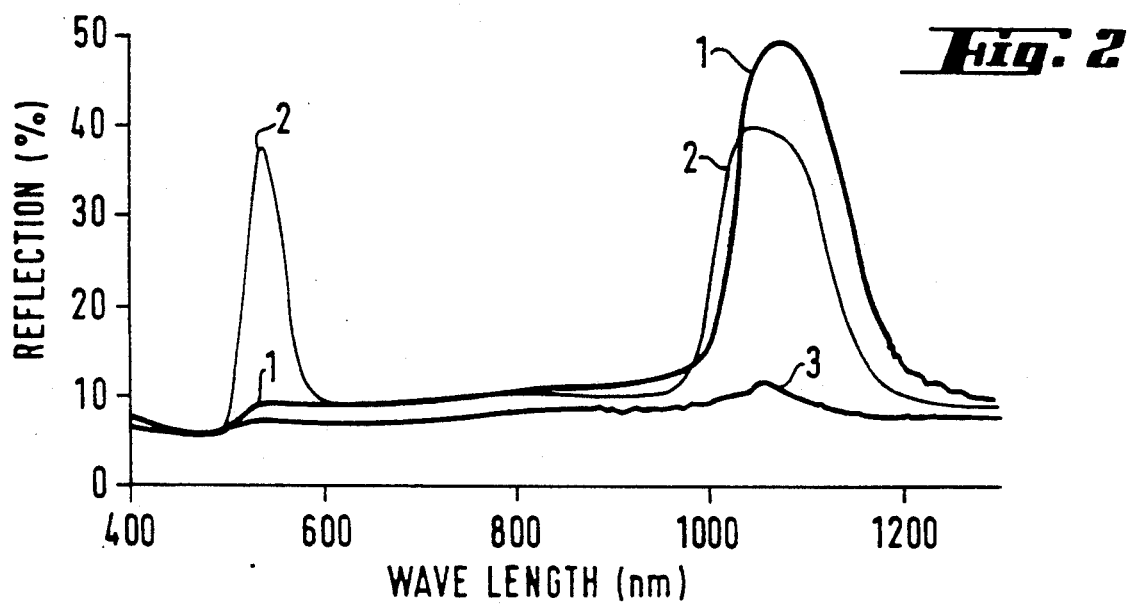
FIG. 2 shows the reflection of the sample from Example 1 before and after the process of this invention has been carried out and after the process has been carried out, at an illuminated point, an unilluminated point and at a point which has been illuminated for too long.
Figure 3:
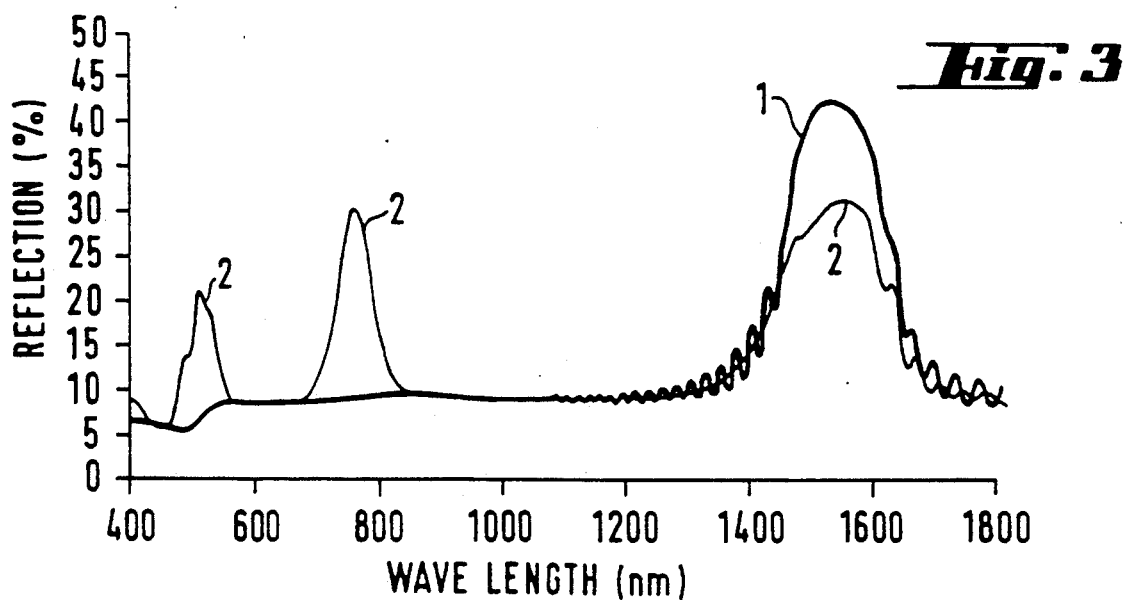
FIG. 3 shows the reflection of the sample from Example 2 before and after the process of this invention has been carried out and after the process has been carried out, at an illuminated and an unilluminated point.

Substance II was aligned with the helix axis perpendicular to the substrate (glass) between two glass plates coated with polyimide as alignment aid, by heating at 140° C. and applying shear forces. The alignment of the substance can be seen from the occurrence of the reflection band at 1550 nm which is typical of this phase (see curve 1 in FIG. 3). The sample was then illuminated with linear-polarized light analogously to Example 1 (as shown in FIG. 1: 200 W mercury high-pressure lamp, 4 cm water cell as heat-radiation filter, quartz condenser, stack of glass plates and foil polarizer for polarizing the light, spectral region of the light at the sample 320 nm–920 nm, power 200 mW/cm² at the sample surface). The illumination time was 5 minutes. The sample illuminated in this way shows, in addition to the reflection band at $\lambda_{ref}$=1550 nm, bands at 770 nm and at 514 nm (see curve 2 in FIG. 3). When the sample was observed under a polarizing microscope, the same effect as described in Example 1 was apparent for the reflected bands. The reflected light must thus be linear-polarized. If only parts of the sample are illuminated, the reflection bands shown in curve 2 of FIG. 3 are apparent in the illuminated areas, while only the known reflection band shown in curve 1 of FIG. 3 occurs in the unilluminated area.

EXAMPLE 3

Figure 4:
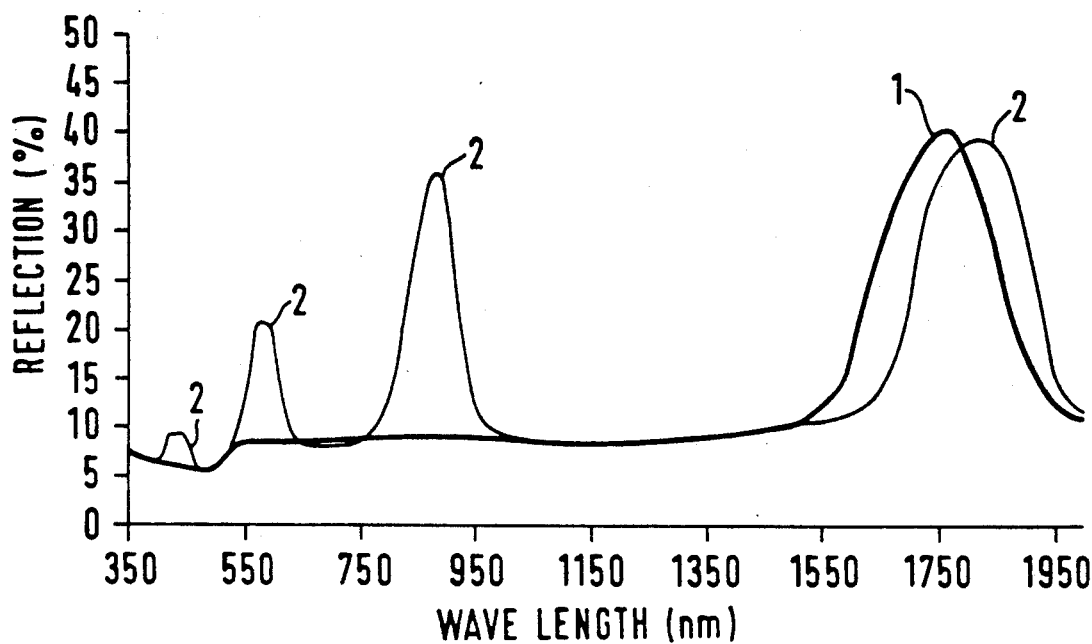
FIG. 4 shows the reflection of the sample from Example 3 before and after the process of this invention has been carried out and after the process has been carried out, at an illuminated and an unilluminated point.

Substance III was aligned with the helix axis perpendicular to the substrate (glass) between two glass plates coated with polyimide as alignment aid, by heating at 140° C. and applying shear forces. The alignment of the substance can be seen from the occurrence of the reflection band at 1800 nm which is typical of this phase (see curve 1 in FIG. 4). The sample was then illuminated with linear-polarized light as described in Example 1 (see FIG. 1; 200 W mercury high-pressure lamp, 4 cm water cell as heat-radiation filter, quartz condenser, stack of glass plates and foil polarizer for polarizing the light, spectral region of the light at the sample 320 nm–920 nm, power 100 mW/cm² at the sample surface). The illumination time was 5 minutes. The optical component produced by illumination showed, in addition to the reflection band at $\lambda_{ref}$=1800 nm, bands at 870 nm, at 575 nm and at 425 nm (see curve 2 in FIG. 4). When the sample is observed under a polarizing microscope, the same effect as described in Example 1 is apparent for the reflected bands. The reflected light is thus linear-polarized. If only parts of the sample are illuminated, the reflection bands shown in curve 2 of FIG. 4 are apparent in the illuminated areas, while only the known reflection band shown in curve 1 of FIG. 4 occurs in the unilluminated area.

EXAMPLE 4

Figure 5:
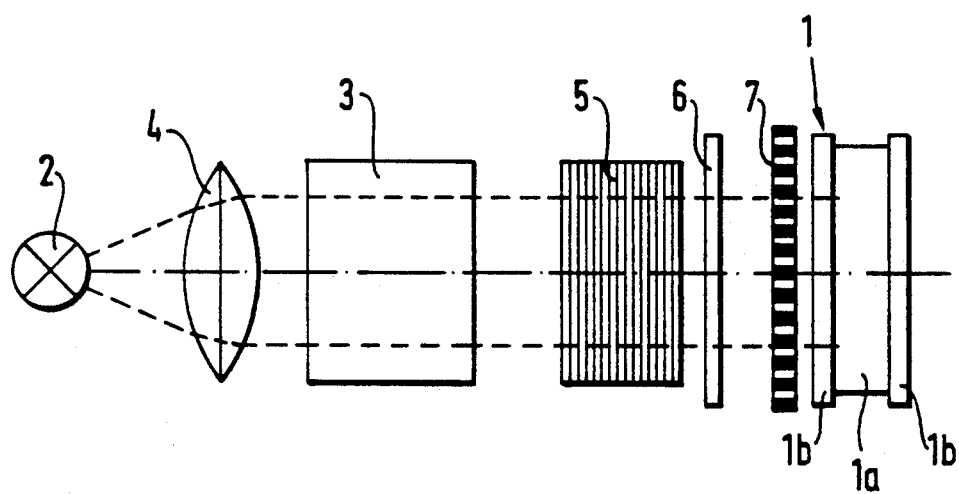
FIG. 5 shows a diagrammatic experimental set-up for the illumination as carried out in Example 4.
Figure 6A:
FIGS. 6a and 6b shows a polarized light photomicrograph (incident light) of the sample from Example 4; a) the sample was rotated until the visible, green reflection was at a maximum; b) the sample was rotated by 90° with respect to a)
Figure 6B:
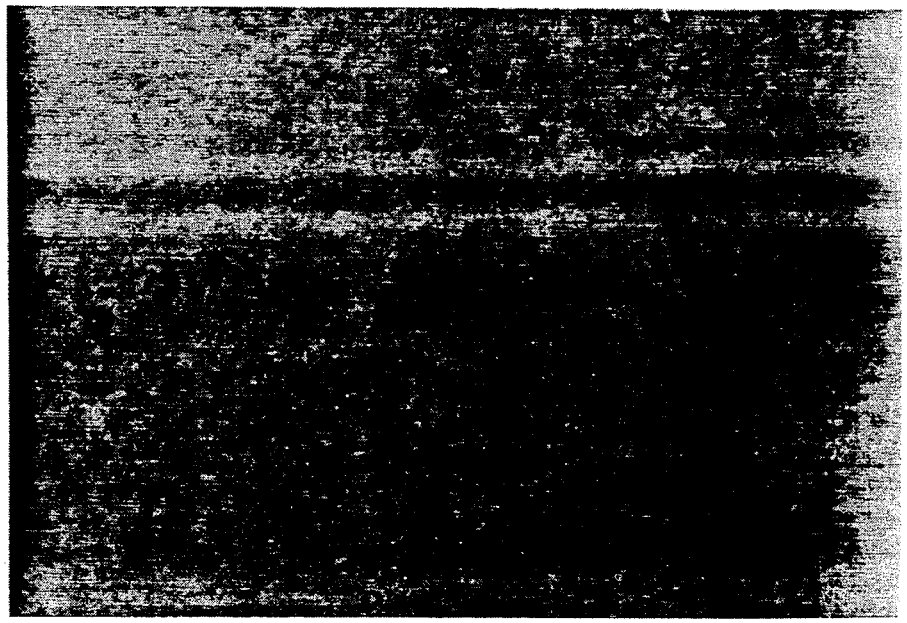

Substance I was aligned with the helix axis perpendicular to the substrate (glass) between two glass plates coated with polyimide as alignment aid, by heating at 140° C. and applying shear forces. The alignment of the substance can be seen from the occurrence of the reflection band at 1080 nm which is typical of this phase (see curve 1 in FIG. 2). The sample was then illuminated with linear-polarized light through a photomask analogously to the procedure described in Example 1. The modified experimental set-up is shown in FIG. 5. The photomask 7 is located in front of sample 1. Otherwise, the set-up is the same as shown in FIG. 1 and described in Example 1. The optical component produced in this way reflects green light (wavelength at about $\lambda_{ref}/2$), as shown in curve 2 of FIG. 2, at the exposed points. At the unexposed points, the optical component only reflects the known reflection band shown in curve 1 of FIG. 2. If this sample is observed under a polarizing microscope (incident light, polarizer and analyzer parallel), the exposed area appears in a defined position (letters "Fo" in FIG. 6, top) on rotating the sample. If the sample is rotated by 90°, this reflection disappears (FIG. 6, bottom). The light reflected in the exposed areas is thus linear-polarized.

EXAMPLE 5

Figure 7:
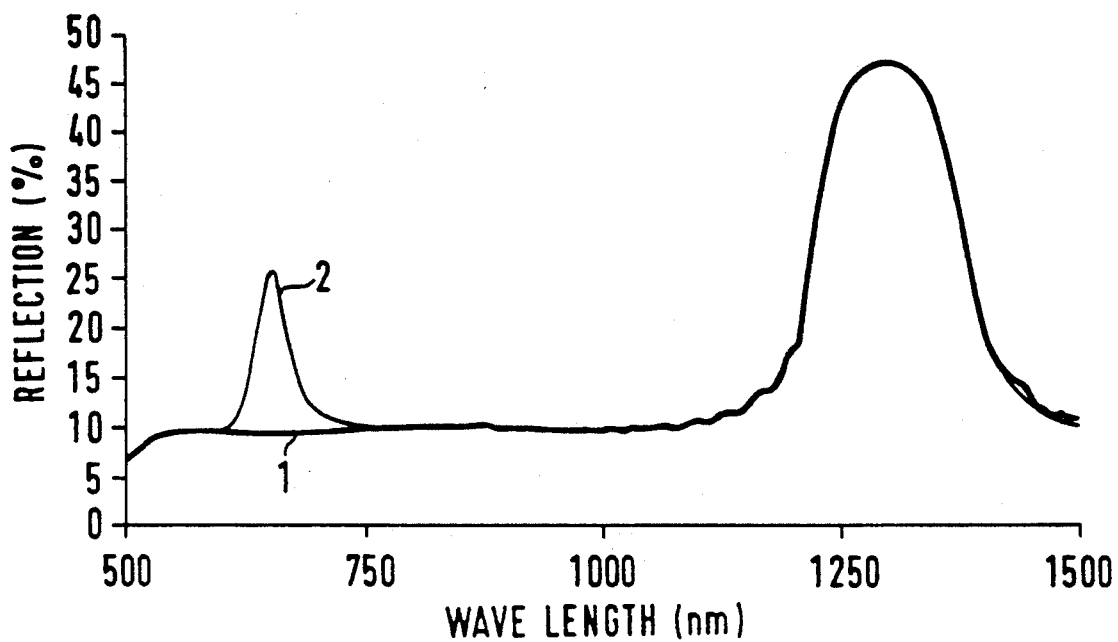
FIG. 7 shows the reflection of the sample from Example 5 before and after the process of this invention has been carried out and after the process has been carried out, at an illuminated and an unilluminated point.
Figure 8:
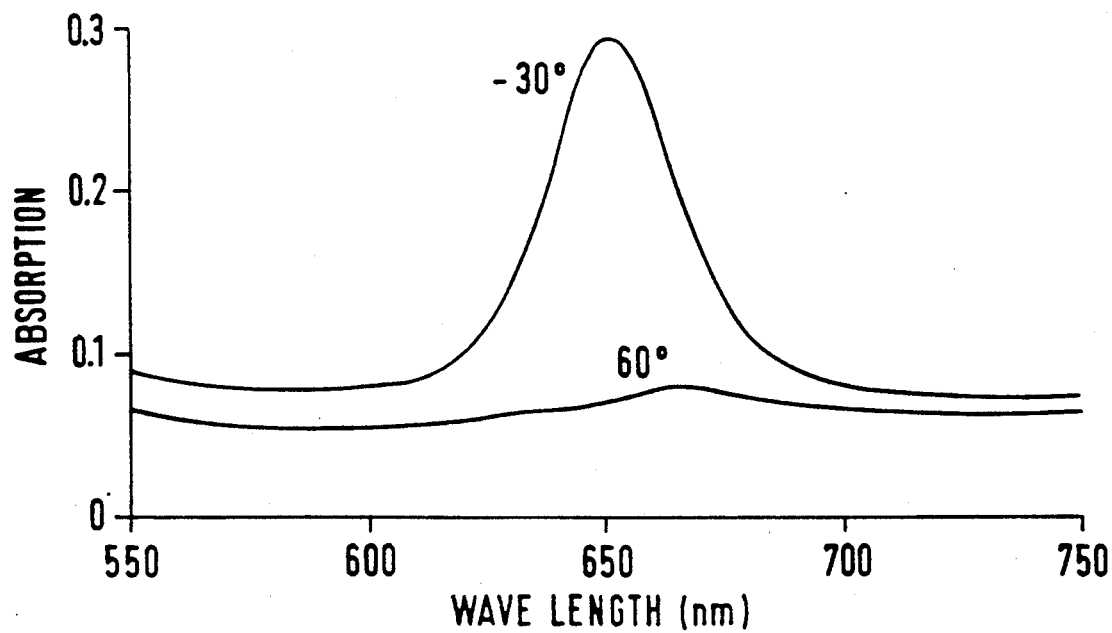
FIG. 8 shows the absorption of an illuminated sample from Example 5 (the angle between the polarization of the measurement light and the polarization of the light used for the illumination is indicated for the two curves)

Substance IV was aligned with the helix axis perpendicular to the substrate (glass) between two glass plates coated with polyimide as alignment aid, by heating at 140° C. and applying shear forces. The alignment of the substance can be seen from the occurrence of the reflection band at 1310 nm which is typical of this phase (curve 1 in FIG. 7). The sample was then illuminated with linear-polarized light as described in Example 1 (FIG. 1, 200 W mercury high-pressure lamp, 4 cm water cell as heat-radiation filter, quartz condenser, stack of glass plates and foil polarizer for polarizing the light, spectral region of the light at the sample 320 nm–920 nm, power 100 mW/cm$^2$ at the sample surface) The illumination time was 10 minutes. In addition to the reflection band at $\lambda_{ref}$=1310 nm, the sample illuminated in this manner shows a band at 650 nm (see curve 2 in FIG. 7). The reflected light of wavelength 650 nm was linear-polarized. This was determined as follows:

In addition to the reflection, the absorption of the sample was determined as a function of the polarization direction of the measurement light. To this end, a linear-polarizer was positioned in front of the sample in the ray path of the spectrophotometer. FIG. 8 shows the absorption at two polarizer positions which differ by 90° C. The dependence of the absorption on the polarization can clearly be seen.

EXAMPLE 6

Figure 9:
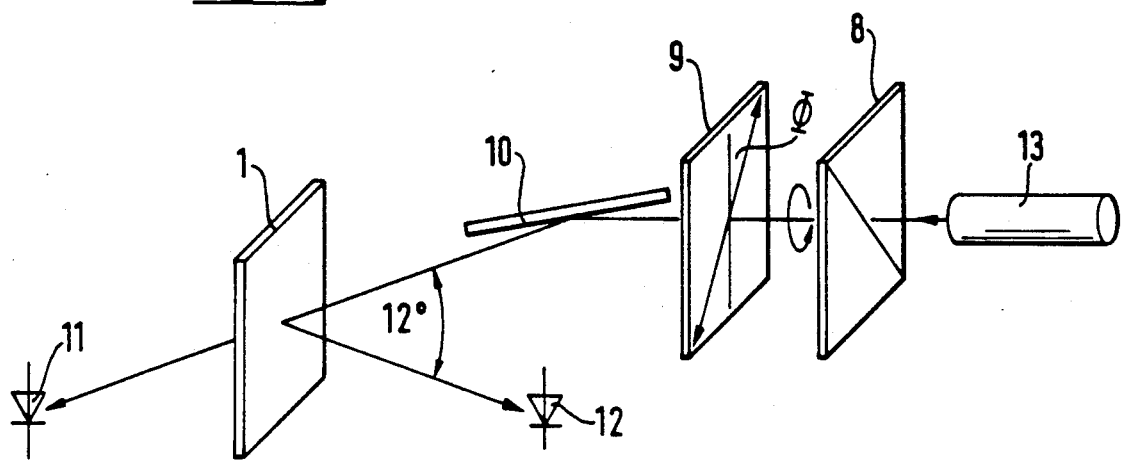
FIG. 9 shows a diagrammatic experimental set-up for determining transmission and reflection of linear-polarized light, as described in Example 6.
Figure 10:
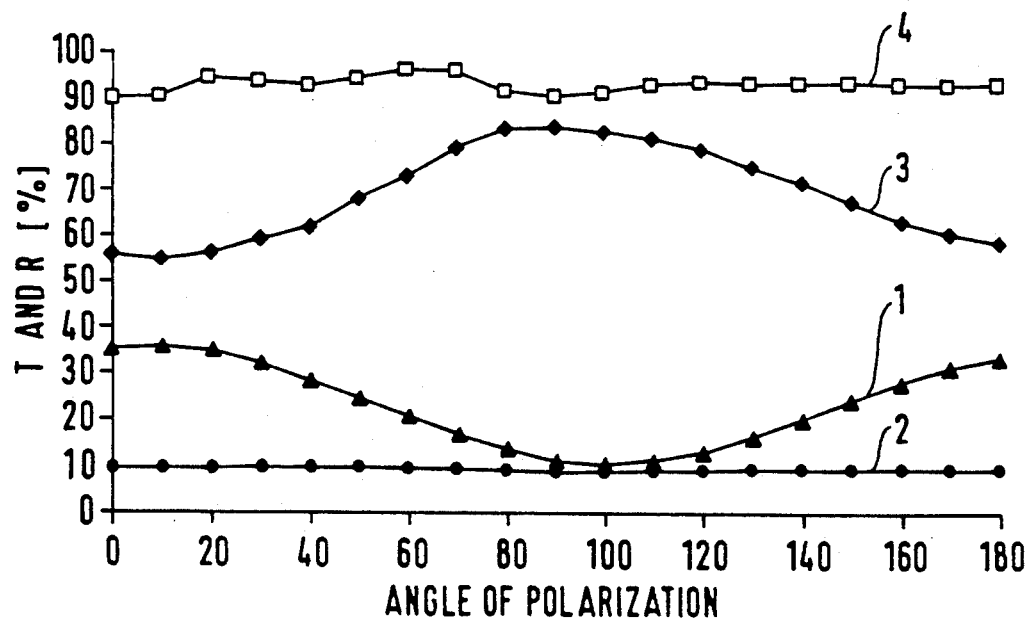
FIG. 10 shows the reflection of the sample from Example 6 before and after the process of this invention has been carried out and after the process has been carried out, at an illuminated and an unilluminated point.
Figure 11:
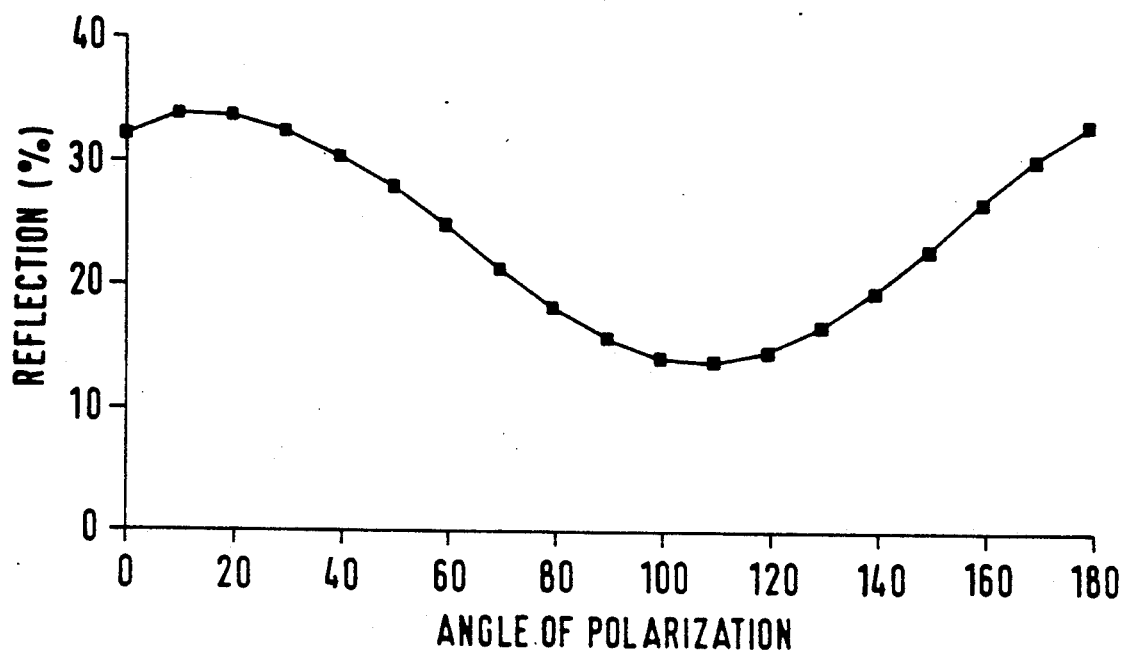
FIG. 11 shows the polarization and intensity of the light reflected by a sample from Example 6.
Figure 12:
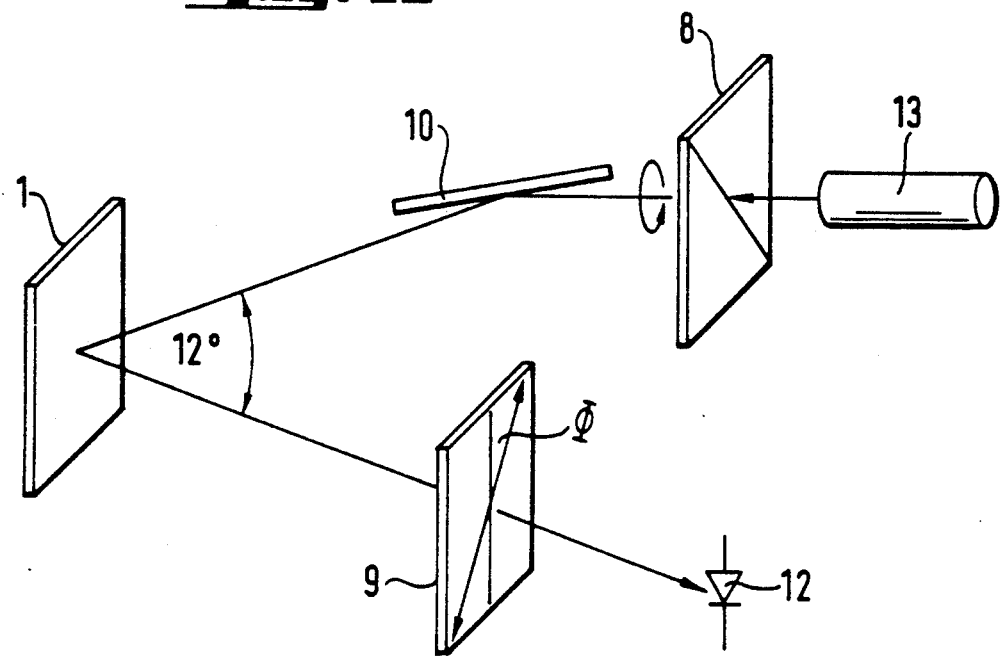
FIG. 12 shows a diagrammatic experimental set-up for determining the polarization of transmitted and reflected light, as described in Example 6.

Substance V was prepared analogously to Example 1. The sample was then illuminated with linear-polarized light (analogously to Example 1, power 100 mW/cm$^2$ at the sample surface, illumination time was 6 minutes). Illumination gives, in addition to the reflection band at $\lambda_{ref}$=1250 nm, a band at about $\lambda_{ref}$/2. The polarization dependence of both this reflection band and of the transmission of the sample at this wavelength was determined by illumination with the light of an HeNe laser (633 nm). The experimental set-up is shown in FIG. 9: the linear-polarized light of an HeNe laser (7) was circular-polarized with the aid of a quarter-wave plate (8) and then linear-polarized again with the aid of a Glan-Thomson polarizer (9). The polarization angle $\phi$ is thus varied so that the same light intensity is obtained on the sample 1 for all angles $\phi$. This light is directed onto sample 1 via a mirror 10. The transmission was measured by the photodiode (11) and the reflection by the photodiode (12). The result is shown in FIG. 10. Curve 1 in FIG. 10 shows that principally light of one polarization direction is reflected. For comparison, an unilluminated area was also measured. There, only the reflection at the glass plates occurs (curve 2 in FIG. 10). Curves 3 and 4 show the independence of the intensity of the transmitted light on the polarization direction of the measurement light at an exposed (curve 3) and at an unexposed point (curve 4). Whereas the transmission is virtually constant for all polarizations at the unexposed point, the decrease in transmission at the polarizer position at which the reflection is high can clearly be seen at the exposed point. Further measurements (FIG. 11) show that the reflected light is linear-polarized. These measurements were carried out as shown in FIG. 12. The linear-polarized light of the HeNe laser 7 was circular-polarized with the aid of a quarter-wave plate 8. The sample 1 was illuminated with this light via a mirror 10. The polarization dependence of the intensity of the reflected light was determined by means of the polarizer 9 and the potodiode 12. The result is shown in FIG. 11.

EXAMPLE 7

Figure 13:
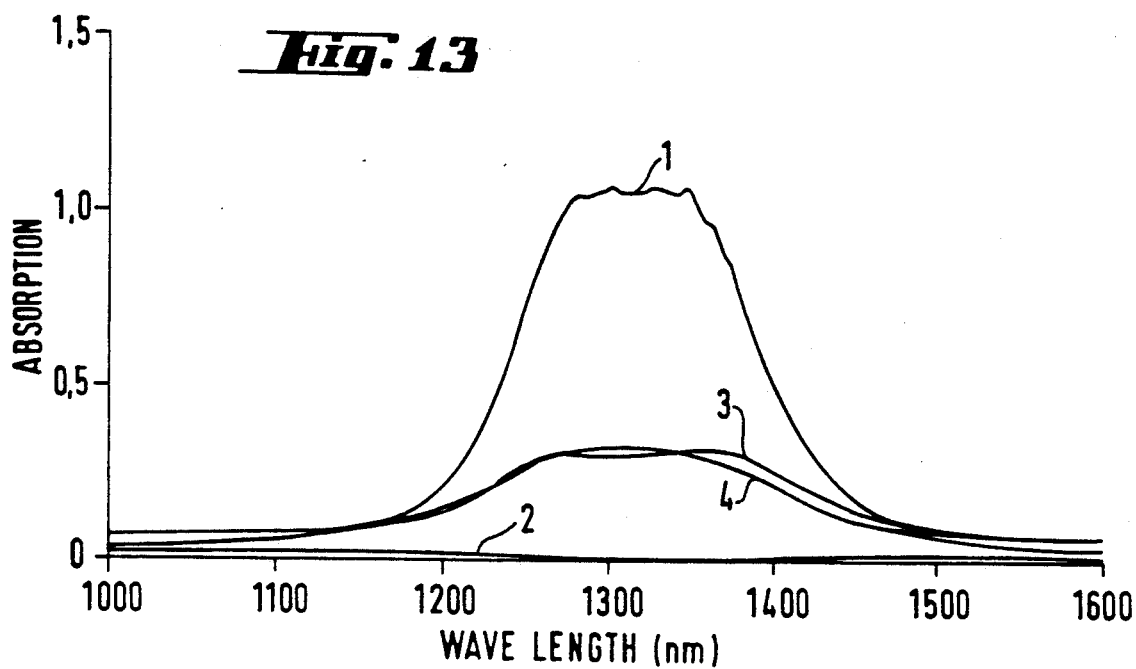
FIG. 13 shows the absorption of the sample from Example 7 before the illumination for (1) left-hand circular-polarized light
(2) right-hand circular-polarized light
(3) linear-polarized light, polarization angle 0°, relative to the later illumination polarization
(4) linear-polarized light, polarization angle shifted by 90° with respect to (3)
Figure 14:
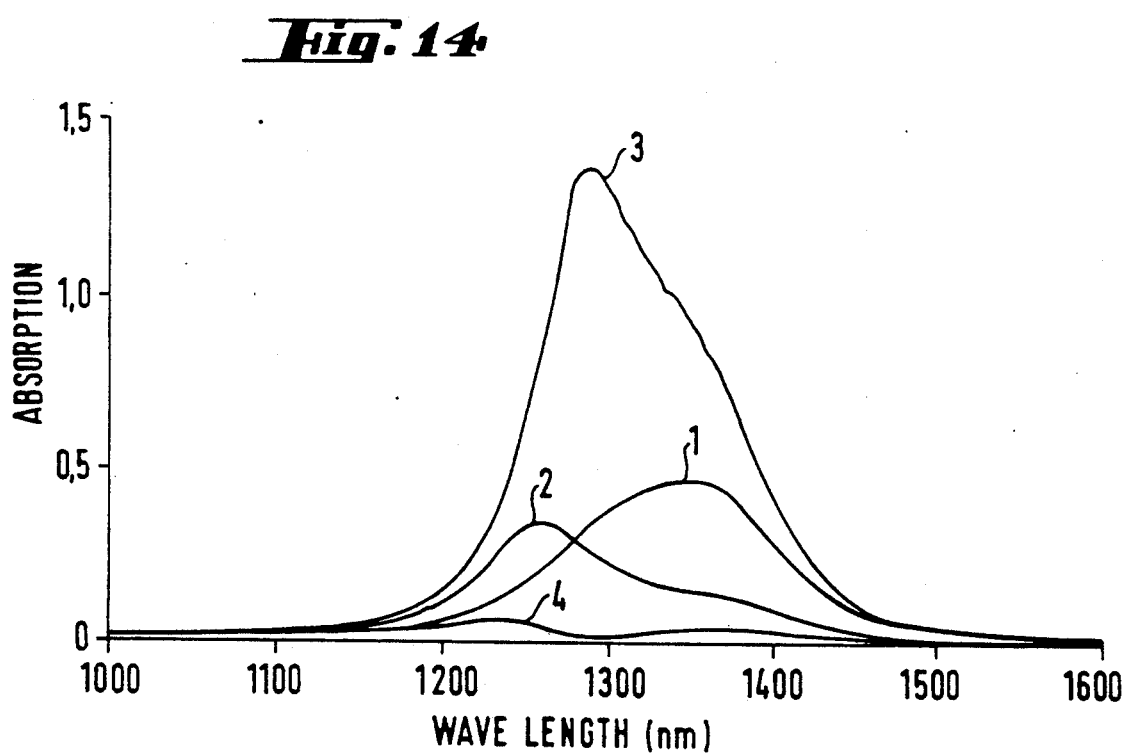
FIG. 14 shows the absorption of the sample from Example 7 after the illumination for (1) left-hand circular-polarized light
(2) right-hand circular-polarized light
(3) linear-polarized light, polarization angle −30°, relative to the illumination polarization
(4) linear-polarized light, polarization angel 60°, relative to the illumination polarization (shifted by 90° with respect to (3).

Substance IV was aligned with the helix axis perpendicular to the substrate (glass) between two glass plates coated with polyimide as alignment aid, by heating at 140° C. and applying shear forces. The alignment of the substance can be seen from the occurrence of the reflection band which is typical of this phase. The sample was then illuminated with linear-polarized light (FIG. 1, 200 W mercury high-pressure lamp, 4 cm water cell as heat-radiation filter, quartz condenser, stack of glass plates and foil polarizer for polarizing the light, spectral region of the light at the sample 320 nm–920 nm, power 100 mW/cm$^2$ at the sample surface, illumination time was 10 minutes. In addition to the reflection, the absorption of the sample was determined in the originally present reflection band at 1350 nm as a function of the polarization state of the measurement light. To this end, a linear-polarizer or circular polarizer for 1300 nm was positioned in front of the sample in the ray path of the spectrophotometer. FIG. 13 shows the absorption before the illumination for various polarization states. FIG. 14 shows the absorption after the illumination for various polarization states. It can clearly be seen that the reflected light (reflection=1−transmission) is left-hand circular-polarized before the illumination and is linear-polarized after the illumination.

What is claimed is:

1. An optical element containing only one optically effective component based on helical liquid-crystalline substances, and said element reflects light incident perpendicular to the surface in a linear-polarized manner parallel to the direction of incidence of the incident light.

2. The optical element of claim 1, wherein said element is used as a linear polarizer.

3. The optical element of claim 1, wherein said element is used as a line filter.

4. The optical element of claim 1, wherein said element is used in an optical storage system.

5. The optical element of claim 1, wherein said element is used as a reflector.

6. An optical element containing only one optically effective component based on helical liquid-crystalline substances, and said element is obtained by illuminating a helical liquid-crystalline substance with linear-polarized light such that said substance is subsequently aligned to exhibit at least one reflection band of linear-polarized light upon illumination.

7. A process for preparing an optical element containing only one optically effective component based on helical liquid-crystalline substances, and said element reflects light incident perpendicular to the surface in a linear-polarized manner parallel to the direction of incidence of the incident light, which comprises illuminating a helical liquid-crystalline substance which contains at least one photoisomerizable compound with linear-polarized light such that said substance is subsequently aligned to exhibit at least on refection band of linear-polarized light upon illumination.

8. The process of claim 7, wherein the helical liquid-crystalline substance is a helical liquid-crystalline organopolysiloxane.

9. The process of claim 7, wherein the helical liquid-crystalline substance is a helical liquid-crystalline organopolysiloxane containing mesogenic radicals in the side chain.

10. The process of claim 7, wherein the absorption characteristics of the compound and the wavelength of the linear-polarized light are matched such that the spectrum of the light and the absorption of the dye overlap.

* * * * *